United States Patent
Yamada et al.

(10) Patent No.: US 7,684,113 B2
(45) Date of Patent: Mar. 23, 2010

(54) IMAGING DEVICE INCLUDING AN OPTICAL MEMBER HAVING A WATER-REPELLENT OR WATER/OIL-REPELLENT COATING, AN ANTIREFLECTION COATING, AN INFRARED-CUTTING GLASS, AND A LOWPASS FILTER IN THIS ORDER FROM THE SIDE OF THE LENS

(75) Inventors: Kazuhiro Yamada, Saitama (JP); Naohito Sasaki, Tokyo (JP); Hiroyuki Nakayama, Tokyo (JP)

(73) Assignee: HOYA Corporation, Tokyo (JP)

( * ) Notice: Subject to any disclaimer, the term of this patent is extended or adjusted under 35 U.S.C. 154(b) by 125 days.

(21) Appl. No.: 11/782,047

(22) Filed: Jul. 24, 2007

(65) Prior Publication Data

US 2008/0024863 A1 Jan. 31, 2008

(30) Foreign Application Priority Data

Jul. 25, 2006 (JP) .............................. 2006-202336

(51) Int. Cl.
*F21V 9/04* (2006.01)
*G02B 5/20* (2006.01)

(52) U.S. Cl. ................ 359/359; 359/590; 359/884; 428/426

(58) Field of Classification Search ................ 359/884, 359/580, 589, 590, 359, 588, 581; 313/112; 428/469, 411.1, 421, 426; 396/25–29, 427
See application file for complete search history.

(56) References Cited

U.S. PATENT DOCUMENTS

2006/0193069 A1 8/2006 Miyazaki et al.
2007/0153385 A1* 7/2007 Sakai et al. ................. 359/511

FOREIGN PATENT DOCUMENTS

| JP | 2002 373977 | 12/2002 |
|----|-------------|---------|
| JP | 2006 163275 | 6/2006 |
| JP | 2006 221142 | 8/2006 |
| JP | 2007 17591 | 1/2007 |
| JP | 2007 17916 | 1/2007 |

OTHER PUBLICATIONS

English language Abstract of JP 2002-373977.
English language Abstract of JP 2006-163275.
English language Abstract of JP 2007-17591.
English language Abstract of JP 2007-17916.

* cited by examiner

*Primary Examiner*—Stephone B Allen
*Assistant Examiner*—Jennifer L. Doak
(74) *Attorney, Agent, or Firm*—Greenblum & Bernstein PLC

(57) ABSTRACT

An imaging apparatus comprising an optical member in an optical path from a lens to an imaging device, said optical member comprising a water-repellent or water/oil-repellent coating, a first antireflection coating, an infrared-cutting glass, a lowpass filter, and an infrared-cutting coating in this order from the side of said lens.

13 Claims, 2 Drawing Sheets

IMAGING DEVICE INCLUDING AN OPTICAL MEMBER HAVING A WATER-REPELLENT OR WATER/OIL-REPELLENT COATING, AN ANTIREFLECTION COATING, AN INFRARED-CUTTING GLASS, AND A LOWPASS FILTER IN THIS ORDER FROM THE SIDE OF THE LENS

FIELD OF THE INVENTION

The present invention relates to an imaging apparatus comprising an optical member having a water-repellent or water/oil-repellent coating in an optical path.

BACKGROUND OF THE INVENTION

Imaging apparatuses for converting optical image to electric signals, such as digital still cameras, and image-inputting apparatuses such as facsimiles, scanners, etc. have recently got widely used. As electronic imaging apparatuses comprising imaging devices such as charge-coupled devices (CCD), etc. have been finding wider applications, problems have become serious by foreign matter such as dust, etc. existing in an optical path to a light-receiving surface of the imaging device, which tends to appear in the resultant image.

For instance, in the case of a digital single-lens reflex camera having an exchangeable shooting lens, dust, etc. tend to intrude into a mirror box when the shooting lens is detached. Also, because a mechanism for controlling the movement of a mirror and the closing of a diaphragm shutter is operated in the mirror box, dust is likely to be generated in the mirror box. In the case of the image-inputting apparatuses such as a facsimile, a scanner, etc., foreign matter such as dust, etc. is likely to be generated when a manuscript is fed or moves through a manuscript-reading unit, resulting in attaching to a light-receiving surface of the CCD or to a manuscript-placing platen glass, etc. Foreign matter attached to the imaging device surface, etc. is usually blown off by an air blower, etc. However, the blown foreign matter remains in the imaging apparatus.

The digital still camera is provided with an optical filter for controlling spatial frequency characteristics near an imaging device, and a birefringent quartz plate is generally used as the optical filter. However, because quartz has a piezoelectric effect, it is easily charged by vibration, etc., and the resultant charge is less likely to disappear. Accordingly, when foreign matter floats in the camera by vibration, airflow, etc. caused by the operation of the camera, it tends to be attached to the charged optical filter. The attached foreign matter should be removed by blowing air to the optical filter, or wiping or vibrating the optical filter. However, the mechanical removal of dust is expensive, makes the apparatus heavier, and consumes more electric power.

JP 2006-163275 A discloses an optical part constituted by an optical lowpass filter of quartz and an infrared-cutting filter, and having a coating for preventing the attachment of foreign matter on the surface. When this optical part is disposed in an optical path in an imaging apparatus, the light passes through the foreign-matter-resistant coating, the infrared-cutting filter the optical lowpass filter, and enters into the imaging device. Because the optical part surface is provided with the foreign-matter-resistant coating on the surface, it is presumed that the foreign matter is less likely to appear in the resultant image. However, there is still some foreign matter appearing in the image. As a result of intensive research, it has been found that this is mainly caused by scratches on the optical lowpass filter. As demand is mounting for clear image, an imaging apparatus free from adverse influence on the image is increasingly desired.

OBJECTS OF THE INVENTION

Accordingly, an object of the present invention is to provide an imaging apparatus comprising an optical member resistant to the attachment of foreign matter.

SUMMARY OF THE INVENTION

As a result of intense research in view of the above object, the inventors have found that in an imaging apparatus comprising an optical member comprising an antireflection coating, an infrared-cutting glass and a lowpass filter in an optical path from a lens to an imaging device, the formation of a water-repellent or water/oil-repellent coating at least on a surface of the antireflection coating on the lens side makes the optical member resistant to the attachment of foreign matter. The present invention has been completed based on such finding.

Thus, the imaging apparatus of the present invention comprises an optical member in an optical path from a lens to an imaging device, said optical member comprising a water-repellent or water/oil-repellent coating, an antireflection coating, an infrared-cutting glass, and a lowpass filter in this order from the side of said lens.

Said optical member may have another antireflection coating on a surface of said lowpass filter. A surface of said lowpass filter on the imaging device side may be provided with an infrared-cutting coating.

Said optical member preferably further comprises a water-repellent or water/oil-repellent coating on a surface on the side of said imaging device.

Said water-repellent or water/oil-repellent coating preferably contains fluorine. Said water-repellent or water/oil-repellent coating is preferably as thick as 0.4-100 nm. An outermost layer of said antireflection coating in contact with said water-repellent or water/oil-repellent coating is preferably made of silicon dioxide.

In one embodiment of the present invention, said optical member comprises a low-surface-resistivity coating made of conductive or semi-conductive metal oxide between said water-repellent or water/oil-repellent coating and said infrared-cutting glass. In another embodiment of the present invention, said optical member comprises a first low-surface-resistivity coating made of a conductive or semi-conductive metal oxide between said water-repellent or water/oil-repellent coating and said infrared-cutting glass, and a second low-surface-resistivity coating made of a conductive or semi-conductive metal oxide between said lowpass filter and an imaging-device-side surface of the optical member. In any case, the surface having the low-surface-resistivity coating preferably has surface resistivity of $1 \times 10^4$ to $1 \times 10^{13}$ $\Omega$/square.

Said metal oxide is preferably at least one selected from the group consisting of antimony oxide, indium tin oxide and antimony tin oxide.

DETAILED DESCRIPTION OF THE PREFERRED EMBODIMENTS

Figure 1:
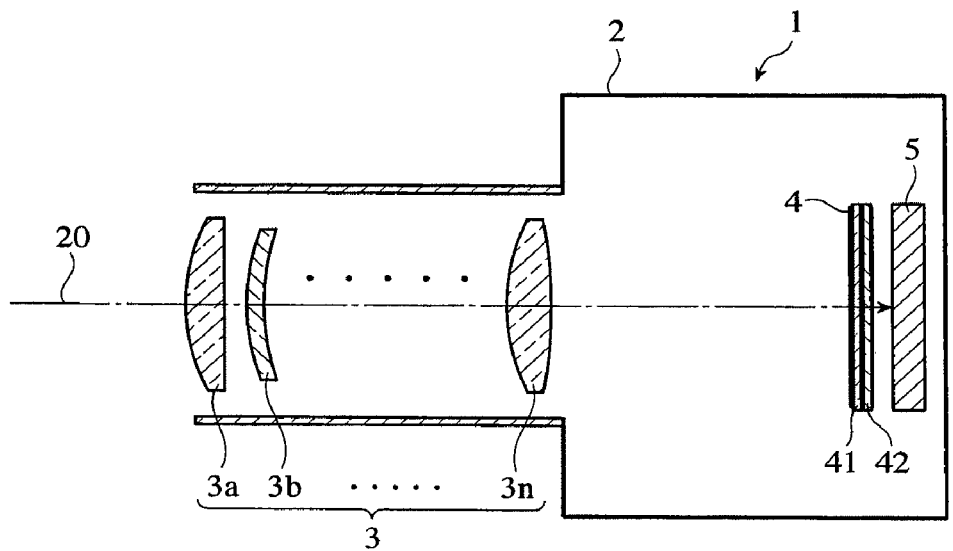
FIG. 1 is a schematic cross-sectional view showing one example of the first imaging apparatus of the present invention.

FIG. 1 schematically shows one example of the imaging apparatus of the present invention. The imaging apparatus 1 shown in FIG. 1 comprises a lens unit 3 constituted by n lenses 3a, 3b, . . . 3n from the incident side of light, a light-transmitting optical member 4, and an imaging device 5 in this order in an optical path 20 in a camera body 2. Light coming from the side of the lens unit 3 passes through the optical member 4 and enters into the imaging device 5.

Figure 2:
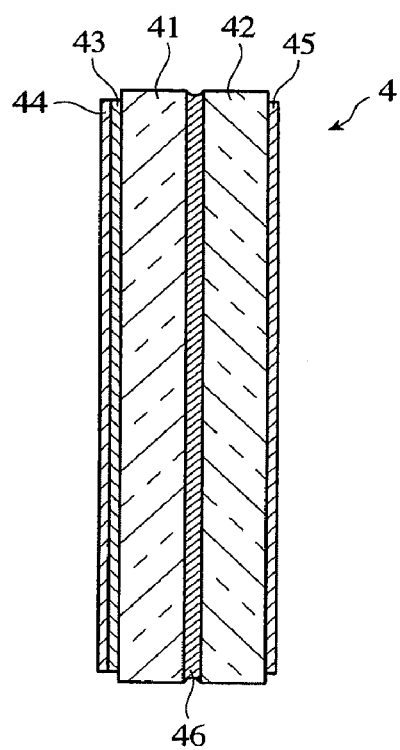
FIG. 2 is a cross-sectional view showing one example of an optical member used in the imaging apparatus of the present invention.

As shown in FIG. 2, the optical member 4 comprises an infrared-cutting glass 41 and a lowpass filter 42 adhered to each other, the infrared-cutting glass 41 having a first antireflection coating 43, and a water-repellent or water/oil-repellent coating 44 (hereinafter referred to simply as water-repellent, oil-repellent coating unless otherwise particularly mentioned) formed on the outer surface in this order, and the lowpass filter 42 having a second antireflection coating 45 formed on the outer surface. There is an adhesive layer 46 between the infrared-cutting glass 43 and the lowpass filter 44. As shown in FIG. 1, this optical member 4 is disposed such that the infrared-cutting glass 41 is located on the side of the lens unit 3, while the lowpass filter 42 is located on the side of the imaging device 5. Accordingly, the optical member 4 comprises the water-repellent, oil-repellent coating 44, the first antireflection coating 43, the infrared-cutting glass 41, the adhesive layer 46, the lowpass filter 42 and the second antireflection coating 45 in this order from the side of the lens unit 3 (FIG. 2).

The infrared-cutting glass 41 may be a usual one, and is preferably infrared-absorbing glass (IR glass). It may also be a laminate comprising titanium oxide layers and silicon dioxide layers alternately. When the infrared-cutting glass 41 is a laminate, it may be formed directly on the lowpass filter 42, making the adhesive layer 46 unnecessary.

The lowpass filter 42 may be a birefringent plate having such thickness as functioning as a lowpass filter. Preferred materials for the lowpass filter 42 include quartz, lithium niobate, etc. The lowpass filter 42 may be a diffraction-lattice-type optical lowpass filter.

The first and second antireflection coatings 43, 45 may be made of the same or different materials, which are not restrictive. Specific examples of materials for the antireflection coatings 43, 45 include silicon oxide, titanium oxide, magnesium fluoride, silicon nitride, cerium oxide, aluminum oxide, tantalum pentoxide, and zirconium oxide. Each antireflection coating 43, 45 may be a single layer or a multi-layer. However, a layer in the antireflection coating in contact with the water-repellent, oil-repellent coating 44 is preferably made of silicon dioxide. Thus, the first antireflection coating 43 is preferably a silicon dioxide layer when it is a single layer, and it preferably has an outermost layer made of silicon dioxide when it is a multi-layer. The silicon dioxide layer is closely adhered to the fluorine-containing, water-repellent, oil-repellent coating 44. The example shown in FIG. 2 does not have such requirement, because the second antireflection coating 45 is not in contact with the water-repellent, oil-repellent coating 44.

Materials for the water-repellent, oil-repellent coating 44 are not restrictive as long as they are colorless and highly transparent. Such materials include fluorine-containing, organic compounds and fluorine-containing, organic-inorganic hybrid polymers.

The fluorine-containing organic compounds include fluororesins and fluorinated pitch (for instance, CFn, wherein n is 1.1-1.6). Examples of the fluororesins include polymers of fluorine-containing olefinic compounds, and copolymers of the fluorine-containing olefinic compounds and copolymerizable monomers. Examples of such (co)polymers include polytetrafluoroethylene (PTFE), tetraethylene-hexafluoropropylene copolymer (PFEP), ethylene-tetrafluoroethylene copolymer (PETFE), tetrafluoroethylene-perfluoroalkylvinyl ether copolymer (PFA), ethylene-chlorotrifluoroethylene copolymer (PECTFE), tetrafluoroethylene-hexafluoropropylene-perfluoroalkylvinyl ether copolymer (PEPE), polychlorotrifluoroethylene (PCTFE), polyvinylidene fluoride (PVDF), and polyvinyl fluoride (PVF). Usable as the fluororesins are polymers of commercially available fluorine-containing compositions, which may be Opstar available from JSR Corporation, and CYTOP available from Asahi Glass Co., Ltd.

The fluorine-containing organic-inorganic hybrid polymers include organosilicon polymers having fluorocarbon groups, which may be polymers obtained by the hydrolysis of fluorine-containing silanes having fluorocarbon groups. The fluorine-containing silanes may be represented by the following formula (1):

$$CF_3(CF_2)_a(CH_2)_2SiR_bX_c \qquad (1),$$

wherein R is an alkyl group, X is an alkoxy group or a halogen atom, a is an integer of 0-7, b is an integer of 0-2, and c is an integer of 1-3, meeting b+c=3. Specific examples of the silanes represented by the formula (1) include $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_2SiCH_3(OCH_3)_2$, $CF_3(CF_2)_7(CH_2)_2SiCH_3Cl_2$, etc. Commercially available organosilicon polymers include Novec EGC-1720 available from Sumitomo 3M Limited, and XC98-B2472 available from GE Toshiba Silicones Co.

The thickness of the water-repellent, oil-repellent coating 44 is preferably 0.4-100 nm, more preferably 10-80 nm. When the water-repellent, oil-repellent coating is thinner than 0.4 nm, its water repellency and oil repellency are insufficient. When the water-repellent, oil-repellent coating is thicker than 100 nm, it has so low transparency and electric conductivity that the optical characteristics of the antireflection coating are changed. The refractive index of the water-repellent, oil-repellent coating is preferably 1.5 or less, more preferably 1.45 or less. Although the water-repellent, oil-repellent coating may be formed by a vapor deposition method, it is preferably formed by a wet method such as a sol-gel method, etc.

The adhesive layer 46 may be made of usual adhesives, which include heat-curable resin adhesives, ultraviolet-curable resin adhesives and room-temperature-curable adhesives, and the ultraviolet-curable resin adhesives are preferable. As described later, when the optical member 4 has an ultraviolet-cutting function, the ultraviolet-curable resin adhesive layer should be cured before the ultraviolet-cutting filter, etc. are laminated.

Figure 3:
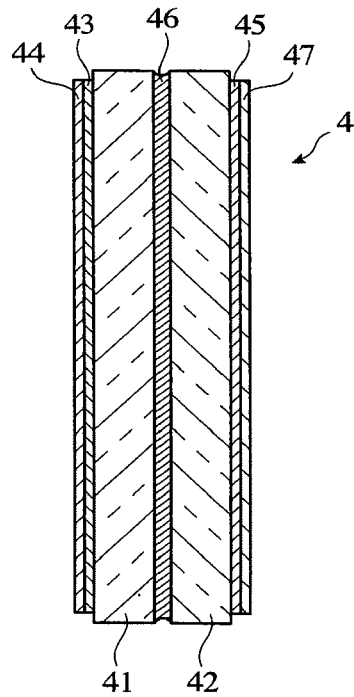
FIG. 3 is a cross-sectional view showing another example of an optical member used in the imaging apparatus of the present invention.

Because an example shown in FIG. 3 is the same as that shown in FIGS. 1 and 2 except that first and second water-repellent, oil-repellent coatings 44, 47 are formed on both outermost surfaces, only differences will be explained below. The material and thickness of the second water-repellent, oil-repellent coating 47 may be the same as or different from those of the first water-repellent, oil-repellent coating 44, though they are preferably the same. In the example shown in FIG. 3, because the second antireflection coating 45 is in contact with the second water-repellent, oil-repellent coating 47, the second antireflection coating 45 preferably has an outermost surface of silicon dioxide from the aspect of adhesion.

Figure 4:
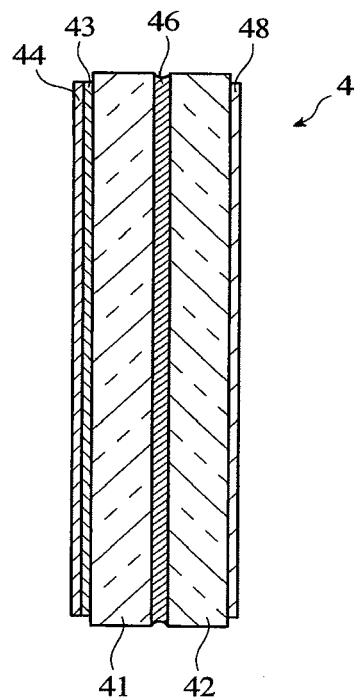
FIG. 4 is a cross-sectional view showing a further example of an optical member used in the imaging apparatus of the present invention.

FIG. 4 shows a further example of an optical member 4 used in the imaging apparatus of the present invention. Because the optical member 4 is the same as shown in FIGS. 1 and 2 except for comprising a water-repellent, oil-repellent coating 44, an antireflection coating 43, an infrared-cutting glass 41, an adhesive layer 46, a lowpass filter 42, and an infrared-cutting coating 48 in this order from the side of a lens unit 3, only differences will be explained below.

The infrared-cutting coating 48 is preferably a laminate of titanium oxide layers and silicon dioxide layers alternately. With such laminate structure, the infrared-cutting coating 48 also acts as an antireflection coating in a visible light range. A water-repellent, oil-repellent coating (not shown) may also be formed on the infrared-cutting coating 48.

The optical member 4 may have an ultraviolet-cutting function. To provide the optical member 4 with an ultraviolet-cutting function, an ultraviolet-cutting filter may be added, or the water-repellent, oil-repellent coatings 44, 47 may contain an ultraviolet-cutting material. A usual ultraviolet-cutting filter may be used, unless it hinders the transparency and light transmittance of the optical member 4. For instance, it may be an ultraviolet-cutting glass having a usual glass composition, to which $CeO_2$, $FeO$, $TiO_2$, etc. are added, an ultraviolet-absorbing paint coat containing Ti, Ce, etc., or a sputtered or vapor-deposited film of an ultraviolet-absorbing material.

Said optical member preferably comprises a low-surface-resistivity coating made of conductive or semi-conductive metal oxide, (a) between said water-repellent or water/oil-repellent coating and said infrared-cutting glass, or (b) between said water-repellent or water/oil-repellent coating and said infrared-cutting glass, and between said lowpass filter and an imaging-device-side surface. The conductive or semi-conductive metal oxide is not restrictive as long as it is a transparent, conductive oxide, but it is preferably at least one selected from the group consisting of antimony oxide ($Sb_2O_5$), indium tin oxide (ITO) and antimony tin oxide (ATO).

Though the thickness of the low-surface-resistivity coating may differ depending on the type of a metal oxide used, it is preferably 1-5,000 nm, more preferably 10-3,000 nm. When the low-surface-resistivity coating is as thin as less than 1 nm, it fails to fully exhibit charge-preventing function. On the other hand, when it is thicker than 5,000 nm, the thickness of the low-surface-resistivity coating is uneven, and the low-surface-resistivity coating has low transparency.

The surface resistivity of the low-surface-resistivity coating is preferably $1 \times 10^4$ to $1 \times 10^{13}$ Ω/square, more preferably $1 \times 10^5$ to $1 \times 10^{13}$ Ω/square. The low-surface-resistivity coating having surface resistivity of less than $1 \times 10^4$ Ω/square has low transparency. On the other hand, when the surface resistivity exceeds $1 \times 10^{13}$ Ω/square, the low-surface-resistivity coating substantially fails to exhibit an antistatic function to prevent the adsorption of dust.

The low-surface-resistivity coating is preferably formed by a wet method such as a sol-gel method, etc. Because the sol-gel method forms the low-surface-resistivity coating in the air without resorting to a vacuum process, it can form the coating at low cost. The sol-gel method may be conducted by a dip-coating method, a spray-coating method, a spin-coating method, a bar-coating method, a roll-coating method, etc. Of course, the low-surface-resistivity coating may be formed by a physical deposition method such as a sputtering method, an ion-plating method, etc. or a chemical deposition method.

The preferred layer structures of the optical member include (a) a water-repellent or water/oil-repellent coating, a first antireflection coating, an infrared-cutting glass, a lowpass filter, and an optional second antireflection coating, (b) a water-repellent or water/oil-repellent coating, a first low-surface-resistivity coating, a first antireflection coating, an infrared-cutting glass, a lowpass filter, a second antireflection coating, and an optional second low-surface-resistivity coating, (c) a water-repellent or water/oil-repellent coating, an antireflection coating, an infrared-cutting glass, a lowpass filter, and an infrared-cutting coating, (d) a first water-repellent or water/oil-repellent coating, a first low-surface-resistivity coating, a first antireflection coating, an infrared-cutting glass, a lowpass filter, a second antireflection coating, a second low-surface-resistivity coating, and a second water-repellent or water/oil-repellent coating, etc.

The optical member 4 is preferably subjected to the function of a vibration mechanism. A usual vibration mechanism such as an ultrasonic vibrator, a piezoelectric element, etc. may be used. Vibration given by the vibration mechanism extremely reduces the amount of foreign matter attached to the optical member 4.

The present invention will be explained in more detail referring to Examples below without intention of restricting the present invention thereto.

Example 1

(a) Formation of Antireflection Coating and Infrared-Cutting Coating

Used as a substrate was CD-5000 available from Kyocera Kinseki Corp., which had a lowpass filter of quartz and an infrared-cutting glass of IR glass adhered to each other with a heat-curable resin. A magnesium fluoride layer having a thickness of 67 nm and a silicon dioxide layer having a thickness of 17 nm were successively formed by vapor deposition to provide an antireflection coating on an infrared-cutting-filter-side surface of the substrate. Eight tantalum pentoxide layers and eight silicon dioxide layers were alternately formed by vapor deposition to provide an infrared-cutting coating on a lowpass-filter-side surface of the substrate.

(b) Formation of Water-Repellent, Oil-Repellent Coating

A fluorine-containing, water-repelling agent (OF-110 available from Canon Optron, Inc.) was vapor-deposited to a thickness of 0.01 μm on the antireflection coating obtained in the step (a).

Example 2

(a) Formation of Antireflection Coating

A $Ta_2O_5$ layer (thickness: 16 nm), a $MgF_2$ layer (thickness: 32 nm), a $Ta_2O_5$ layer (thickness: 55 nm), a $MgF_2$ layer (thickness: 15 nm), a $Ta_2O_5$ layer (thickness: 45 nm), a $MgF_2$ layer (thickness: 76 nm), and a $SiO_2$ layer (thickness: 17 nm) were successively formed by vapor deposition on both surfaces of the same substrate as in Example 1.

(b) Formation of Water-Repellent, Oil-Repellent Coating

A water-repellent, oil-repellent coating having a thickness of 0.03 μm and a refractive index of 1.34 was formed by dip-coating a fluorine-containing, surface-treating agent (Novec IGC-1720 available from Sumitomo 3M Limited) on both antireflection coatings obtained in the step (a).

(c) Production of Imaging Apparatus

The optical member obtained in the step (b) was disposed in an optical path in a camera body, such that the infrared-cutting glass was located on the lens side, and that the lowpass filter was located on the imaging device side, thereby providing the imaging apparatus of the present invention.

Example 3

50 g of γ-glycidoxypropyltrimethoxysilane was hydrolyzed by 0.01-N hydrochloric acid, and mixed with 50 g of $Sb_2O_5$ sol (AMT130 available from Nissan Chemical Industries, Ltd.) and further with 10 g of ethanol, to prepare a low-surface-resistivity coating liquid. A substrate CD-5000 available from Kyocera Kinseki Corp., which had a lowpass filter of quartz and an infrared-cutting glass of IR glass adhered to each other with a heat-curable resin, was immersed in the low-surface-resistivity coating liquid, to coat both surfaces of the substrate with the low-surface-resistivity coating liquid to a thickness of 1 μm. Heating was conducted at 140° C. for 1 hour to form a low-surface-resistivity coating.

A magnesium fluoride layer having a thickness of 67 nm and a silicon dioxide layer having a thickness of 17 nm were successively formed by vapor deposition to provide an antireflection coating on an infrared-cutting-glass-side surface of the low-surface-resistivity coating. A water-repellent, oil-repellent coating was formed on this antireflection coating by the vapor deposition of a fluorine-containing, water-repelling agent (OF-110 available from Canon Optron, Inc.) to a thickness of 0.01 μm. Eight tantalum pentoxide layers and eight silicon dioxide layers were alternately formed by vapor deposition to provide an infrared-cutting coating on a lowpass-filter-side surface of the low-surface-resistivity coating.

Example 4

An optical member was produced in the same manner as in Example 3 except for using a transparent, conductive coating liquid comprising indium tin oxide (ITO) as a low-surface-resistivity coating liquid.

Example 5

A magnesium fluoride layer having a thickness of 67 nm and a silicon dioxide layer having a thickness of 17 nm were successively formed by vapor deposition to provide an antireflection coating on an infrared-cutting-glass-side surface of a substrate CD-5000 available from Kyocera Kinseki Corp, which had a lowpass filter of quartz and an infrared-cutting glass of IR glass adhered to each other with a heat-curable resin. A low-surface-resistivity coating made of indium tin oxide (ITO) was formed by vapor deposition on this antireflection coating. A fluorine-containing, water-repelling agent (OF-110 available from Canon Optron, Inc.) was vapor-deposited to a thickness of 0.01 μm on this low-surface-resistivity coating. Eight tantalum pentoxide layers and eight silicon dioxide layers were alternately formed by vapor deposition to provide an infrared-cutting coating on a low-pass-filter-side surface of the substrate.

Comparative Example 1

A $MgF_2$ layer having a thickness of 67 nm was formed by vapor deposition on both surfaces of the same substrate as in Example 1.

Evaluation 1

How the surface of the optical member on the side of the infrared-cutting glass repelled dust was evaluated as follows: After a mixture of silica sand having a particle size of 5-75 μm and acrylic resin particles having a particle size of 15 μm was uniformly applied as dust onto infrared-cutting-filter-side surfaces of the optical members of Examples 1-5, and an infrared-cutting-filter-side surface of the optical member of Comparative Example 1, vibration at an acceleration of 45,000 G was applied by a piezoelectric element to each optical member in the optical axis direction. Observation of a surface of each optical member by the naked eye revealed that there was no dust remaining on the surfaces of the optical members of Examples 1-5, while the optical member of Comparative Example 1 had dust on the surface.

Evaluation 2

With respect to the imaging apparatus of Example 2, and an imaging apparatus (Comparative Example 2), in which an optical member comprising a lowpass filter and an infrared-cutting glass was disposed such that the lowpass filter was on the lens side while the infrared-cutting glass was on the imaging device side, shutter operation was conducted 10,000 times. Each optical member was taken out of the imaging apparatus by removing the lens, and rubbed on the lowpass-filter-side surface with a cotton bud impregnated with methanol 30 times. As a result, the optical member of Example 2 was free from scratches, while the lowpass filter of the optical member of Comparative Example 2 had two linear scratches. It is presumed that because the optical member of Example 2 had a water-repellent, oil-repellent coating resistant to the attachment of foreign matter and having high lubrication and scratch resistance, it was free from scratches. It is also presumed that because the optical member of Comparative Example 2 had no water-repellent, oil-repellent coating, dust was attached to the lowpass filter made of quartz having lower scratch resistance during the shutter operation, and scratches were formed by rubbing with the cotton bud.

Evaluation 3

The surface of the optical member produced in Example 3, on which the low-surface-resistivity coating was formed, had surface resistivity of $8 \times 10^{12}$ Ω/square. The surface of the optical member produced in Examples 4 and 5, on which the low-surface-resistivity coating was formed, had surface resistivity of $1 \times 10^5$ Ω/square.

EFFECT OF THE INVENTION

Because the optical member disposed in an optical path in the imaging apparatus of the present invention has a water-repellent or water/oil-repellent coating on the surface, it is resistant to the attachment of foreign matter. In addition, because the lowpass filter in the optical member is located on the side of the imaging device, it is less likely scratched.

The present disclosure relates to subject matter contained in Japanese Patent Application No. 2006-202336 filed on Jul. 25, 2006, which is expressly incorporated herein by reference in its entirety.

What is claimed is:

1. An imaging apparatus having an optical member in an optical path from a lens to an imaging device, said optical member comprising a water-repellent or water/oil-repellent coating, an antireflection coating, an infrared-cutting glass, and a lowpass filter in this order from the side of said lens.

2. The imaging apparatus according to claim 1, wherein said optical member comprises another antireflection coating on a surface of said lowpass filter on the imaging device side.

3. The imaging apparatus according to claim 1, wherein said optical member further comprises a water-repellent or water/oil-repellent coating on a surface on the side of said imaging device.

4. The imaging apparatus according to claim 1, wherein said optical member further comprises an infrared-cutting coating on a surface of said lowpass filter on the imaging device side.

5. The imaging apparatus according to claim 1, wherein said water-repellent or water/oil-repellent coating contains fluorine.

6. The imaging apparatus according to claim 1, wherein said water-repellent or water/oil-repellent coating is as thick as 0.4-100 nm.

7. The imaging apparatus according to claim 1, wherein an outermost layer of said antireflection coating in contact with said water-repellent or water/oil-repellent coating is made of silicon dioxide.

8. The imaging apparatus according to claim 1, wherein said optical member comprises a low-surface-resistivity coating made of conductive or semi-conductive metal oxide between said water-repellent or water/oil-repellent coating and said infrared-cutting glass.

9. The imaging apparatus according to claim 8, wherein said metal oxide is at least one selected from the group consisting of antimony oxide, indium tin oxide and antimony tin oxide.

10. The imaging apparatus according to claim 8, wherein a surface of said optical member on the lens side had surface resistivity of $1 \times 10^4$ to $1 \times 10^{13}$ Ω/square.

11. The imaging apparatus according to claim 1, wherein said optical member comprises a first low-surface-resistivity coating made of a conductive or semi-conductive metal oxide between said water-repellent or water/oil-repellent coating and said infrared-cutting glass, and a second low-surface-resistivity coating made of a conductive or semi-conductive metal oxide between said lowpass filter and an imaging-device-side surface.

12. The imaging apparatus according to claim 11, wherein both surfaces of said optical member have surface resistivity of $1 \times 10^4$ to $1 \times 10^{13}$ Ω/square.

13. The imaging apparatus according to claim 11, wherein said metal oxide is at least one selected from the group consisting of antimony oxide, indium tin oxide and antimony tin oxide.

* * * * *